(12) United States Patent
Dahm et al.

(10) Patent No.: US 10,115,229 B2
(45) Date of Patent: Oct. 30, 2018

(54) REINFORCEMENT LEARNING FOR LIGHT TRANSPORT

(71) Applicant: NVIDIA Corporation, Santa Clara, CA (US)

(72) Inventors: Ken Patrik Dahm, Berlin (DE); Alexander Keller, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/648,308

(22) Filed: Jul. 12, 2017

(65) Prior Publication Data

US 2018/0018814 A1    Jan. 18, 2018

Related U.S. Application Data

(60) Provisional application No. 62/361,991, filed on Jul. 13, 2016.

(51) Int. Cl.
| | |
|---|---|
| *G06T 15/60* | (2006.01) |
| *G06T 15/50* | (2011.01) |
| *G06N 99/00* | (2010.01) |
| *G06T 15/80* | (2011.01) |
| *G06N 3/08* | (2006.01) |

(52) U.S. Cl.
CPC ............ *G06T 15/506* (2013.01); *G06N 3/08* (2013.01); *G06N 99/005* (2013.01); *G06T 15/80* (2013.01)

(58) Field of Classification Search
None
See application file for complete search history.

(56) References Cited

PUBLICATIONS

Benthin et al., "A Scalable Approach to Interactive Global Illumination," Computer Graphics Forum (Proc. Eurographics), vol. 22, No. 3, 2003, pp. 621-629.
Hachisuka et al., "Progressive photonmapping," ACMTransactions on Graphics, vol. 27, No. 5, Dec. 2008, pp. 130:1-130:8.
Jensen, H., "Importance driven path tracing using the photon map," Rendering Techniques 95 (Proc. 6th Eurographics Workshop on Rendering), 1995, pp. 326-335.
Keller et al., "Deterministic consistent density estimation for light transport simulation," Monte Carlo and Quasi-Monte Carlo Methods, 2013, pp. 467-480.
Keller, A., "Instant radiosity," SIGGRAPH '97: Proceedingsof the 24th annual conference on Computer graphics and interactive technique, 1997, pp. 49-56.

(Continued)

*Primary Examiner* — Frank Chen
(74) *Attorney, Agent, or Firm* — Zilka-Kotab, P.C.

(57) ABSTRACT

A method for light transport includes steps of initializing a data structure that is configured to provide an importance value for each incident sample in a three-dimensional (3D) scene and tracing, in a direction from an origin, a ray of a plurality of rays through the 3D scene to intersect an object at a hitpoint. Additional steps include selecting a next direction of the ray according to a distribution of the importance values at the hitpoint, tracing the ray in the next direction to find a next hitpoint, updating a first importance value corresponding to the hitpoint using a second importance value corresponding to the next hitpoint, and setting the hitpoint of the ray to the next hitpoint. The additional steps are repeated until the next hitpoint is an endpoint. A contribution, based on each hitpoint and the endpoint, to a pixel that is intersected by the ray is recorded.

20 Claims, 11 Drawing Sheets

(56) References Cited

PUBLICATIONS

Keller, A., "Quasi-Monte Carlo image synthesis in a nutshell," Monte Carlo and Quasi-Monte Carlo Methods, 2012, pp. 1-37.

Kollig et al., "Efficient bidirectional path tracing by randomized quasi-Monte Carlo integration," Monte Carlo and Quasi-Monte Carlo Methods, 2002, pp. 290-305.

Keller et al., "Efficient importance sampling techniques for the photon map," Proc. Vision, Modeling, and Visualization, 2000, pp. 271-279.

Pegoraro et al., "Towards interactive global illumination effects via sequential Monte Carlo adaptation," Proceedings of the 3rd IEEE Symposium on Interactive Ray Tracing, 2008, pp. 107-114.

Veach et al., "Bidirectional Estimators for Light Transport.," Proc. 5th Eurographics Worshop on Rendering, Jun. 1994, pp. 1-17.

Vorba et al., "On-line learning of parametric mixture models for light transport simulation," ACM Transactions on Graphics (Proceedings of SIGGRAPH 2014), 2014, vol. 33, No. 4, pp. 1-11.

Ward, G., "Adaptive Shadow Testing for Ray Tracing," 2nd Eurographics Workshop on Rendering, 1991, pp. 1-7.

Wald et al., "Interactive Global Illumination in Complex and Highly Occluded Environments," Rendering Techniques 2002, (Proc. 14th Eurographics Workshop on Rendering), 2003, pp. 74-81.

Wald et al., "Interactive global illumination using fast ray tracing," Rendering Techniques 2002 (Proc. 13th Eurographics Workshop on Rendering), 2002, pp. 15-24.

Greger et al., "The irradiance volume," IEEE Computer Graphics and Applications, vol. 18, No. 2, 1998, pp. 32-43.

Sutton et al., "Introduction to Reinforcement Learning," MIT Press, 1998, pp. 1-102, as retrieved from https://pdfs.semanticscholar.org/aa32/c33e7c832e76040edc85e8922423b1a1db77.pdf.

```
Function pathTrace(camera, scene)
    throughput ← 1
    ray ← setupPrimaryRay(camera)
    for i ← 0 to ∞ do
        y, n ← intersect(scene, ray)
        if i > 0 then
```
$$Q'(x,\omega) = (1-\alpha)Q(x,\omega) + \alpha\left(L_e(y,-\omega) + \int_{\mathcal{H}^2(y)} f_s(\omega_i,y,-\omega)\cos\theta_i Q(y,\omega_i)d\omega_i\right)$$
⟵ 270
```
        if isEnvironment(y) then
            return throughput · getRadianceFromEnvironment(ray, y)
        else if isAreaLight(y) then
            return throughput · getRadianceFromAreaLight(ray, y)
        ω, p_ω, f_s ← sampleScatteringDirectionProportionalToQ(y)    ⟵ 280
        throughput ← throughput · f_s · cos(n, ω) / p_ω
        ray ← y, ω
```

*Fig. 2E*

REINFORCEMENT LEARNING FOR LIGHT TRANSPORT

CLAIM OF PRIORITY

This application claims the benefit of U.S. Provisional Application No. 62/361,991 titled "Learning Light Transport the Reinforced Way," filed Jul. 13, 2016, the entire contents of which is incorporated herein by reference.

FIELD OF THE INVENTION

The present invention relates to ray tracing, and more particularly to reinforcement learning for light transport.

BACKGROUND

One application of light transport simulation is the computational synthesis of images that cannot be distinguished from real photographs. In such simulation algorithms, light transport is modeled by a Fredholm integral equation of the second kind and pixel colors are determined by estimating functionals of the solution of the Fredholm integral equation. The estimators are averages of the contribution of sampled light transport paths or rays that connect light sources and camera sensors.

Compared to reality, where photons and trajectories are abundant, a computer may only consider a tiny fraction of path space, which is one of the dominant reasons that images have noise artifacts. Because the number of paths that may be traced is limited, increasing the number of light transport paths that have an important contribution to the image produces a higher quality image. While research in computer graphics has focused on importance sampling to increase the number of light transport paths that contribute to the image, for some time there has not been a simple and efficient online method that can substantially reduce the number of light transport paths having zero contribution to the image.

FIG. 1A illustrates a prior art diagram 100 of a light path. The surface is directly illuminated by the light source. As shown in FIG. 1A, multiple rays are scattered from a surface 102. When importance sampling is used, most of the rays are cast from the surface 102 in the direction of the light source. Radiance is integrated by sampling from a probability density function p that is proportional to the product of emitted radiance $L_e$ and the bidirectional scattering distribution function $f_r$ representing the physical surface properties. The fraction of radiance that is incident perpendicular to the surface, is taken into account by the cosine of the angle $\theta$ between the surface normal and the direction of incidence.

FIG. 1B illustrates a prior art diagram 110 of an occluded light transport path. The surface 102 should be indirectly illuminated by the light source because the object 105 occludes the light path. Importance sampling does not consider occluding objects, so all of the rays fail to reach the light source. Light transport paths with zero contribution to the image cannot be avoided unless visibility is considered. For example, when a portion of a scene is lit by a light behind a door and the door position changes from open to nearly closed, the occlusion problem can be made arbitrarily more difficult to solve. There is a need for addressing these issues and/or other issues associated with the prior art.

SUMMARY

A method, computer readable medium, and system are disclosed for learning light transport. The method includes the steps of initializing a data structure that is configured to provide an importance value for each incident sample in a three-dimensional (3D) scene and tracing, in a direction from an origin, a first ray of a plurality of rays through the 3D scene to intersect an object at a hitpoint. Additional steps include selecting a next direction of the first ray according to a distribution of the importance values at the hitpoint, tracing the first ray in the next direction from the hitpoint to find a next hitpoint, updating, in the data structure, a first importance value corresponding to the hitpoint of the first ray using a second importance value in the data structure corresponding to the next hitpoint, and setting the hitpoint of the first ray to the next hitpoint. Selecting the next direction, tracing the first ray in the next direction from the hitpoint, updating the data structure, and setting the hitpoint are repeated until the next hitpoint is an endpoint. A contribution, based on each hitpoint and the endpoint, to a first pixel that is intersected by the first ray is recorded.

BRIEF DESCRIPTION OF THE DRAWINGS

FIG. 2E illustrates pseudo code for implementing a path tracer with reinforcement learned importance sampling, in accordance with one embodiment;

DETAILED DESCRIPTION

Reinforcement learning is a machine learning technique that enables a policy to be developed by learning from feedback. Correct or desirable actions are reinforced, and over time, as the policy is implemented, the policy evolves to take actions that are more correct or produce greater rewards. The Q-learning algorithm developed by Watkins in 1989 is based on a table of values, Q, and the inputs to the table are a current state and a next action. The values in the table Q correspond to an expected reward. The values are initialized and, over time, the values in Q are learned as the policy is applied and the values in Q converge. In other words, the policy learns to maximize the expected reward. Given a limited number of next actions for each current state, the values for each next action may be considered and the best value may be selected for the next action.

The techniques used for reinforcement learning may be applied to light transport simulation. The current state becomes a position in a scene, an action becomes selection of a next direction for a ray being traced along a light transport path, and the reward becomes the emitted radiance incident seen at the position coming from the next direction. In the context of the following description, a ray is traced from a sensor (e.g., camera or light source) to intersect objects in a scene. A light transport path is defined by segments of the ray through the scene. A light transport path may be defined starting at a camera and ending at a light source or starting at a light source and ending at a camera.

Figure 1A:
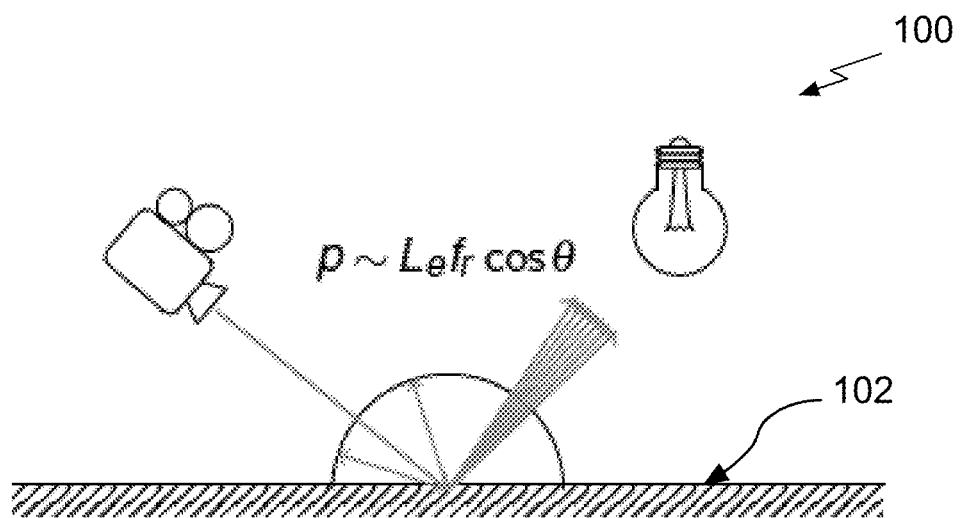
FIGS. 1A and 1B illustrate prior art diagrams of a light path.
Figure 1B:
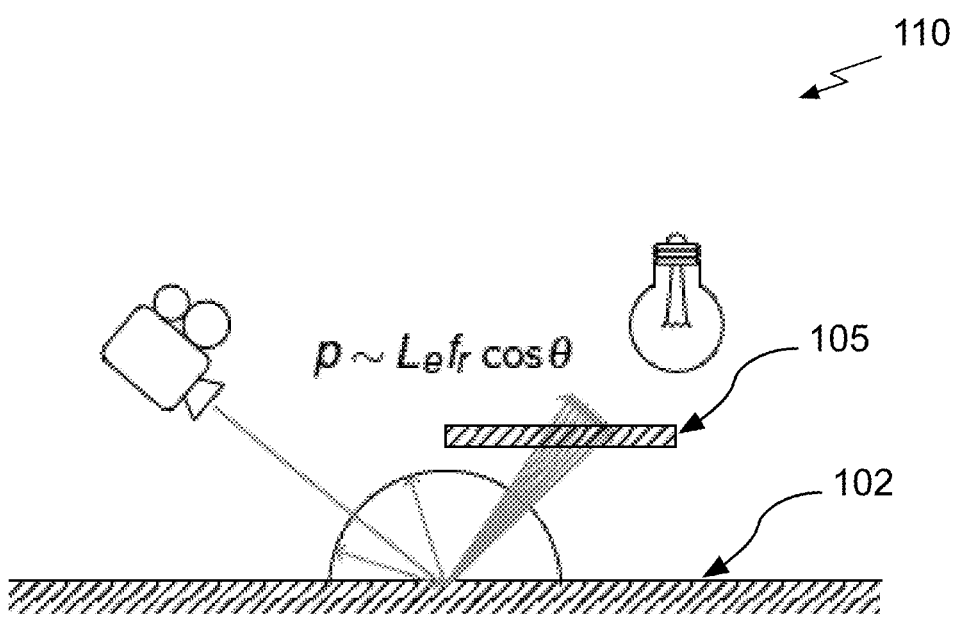
Figure 1C:
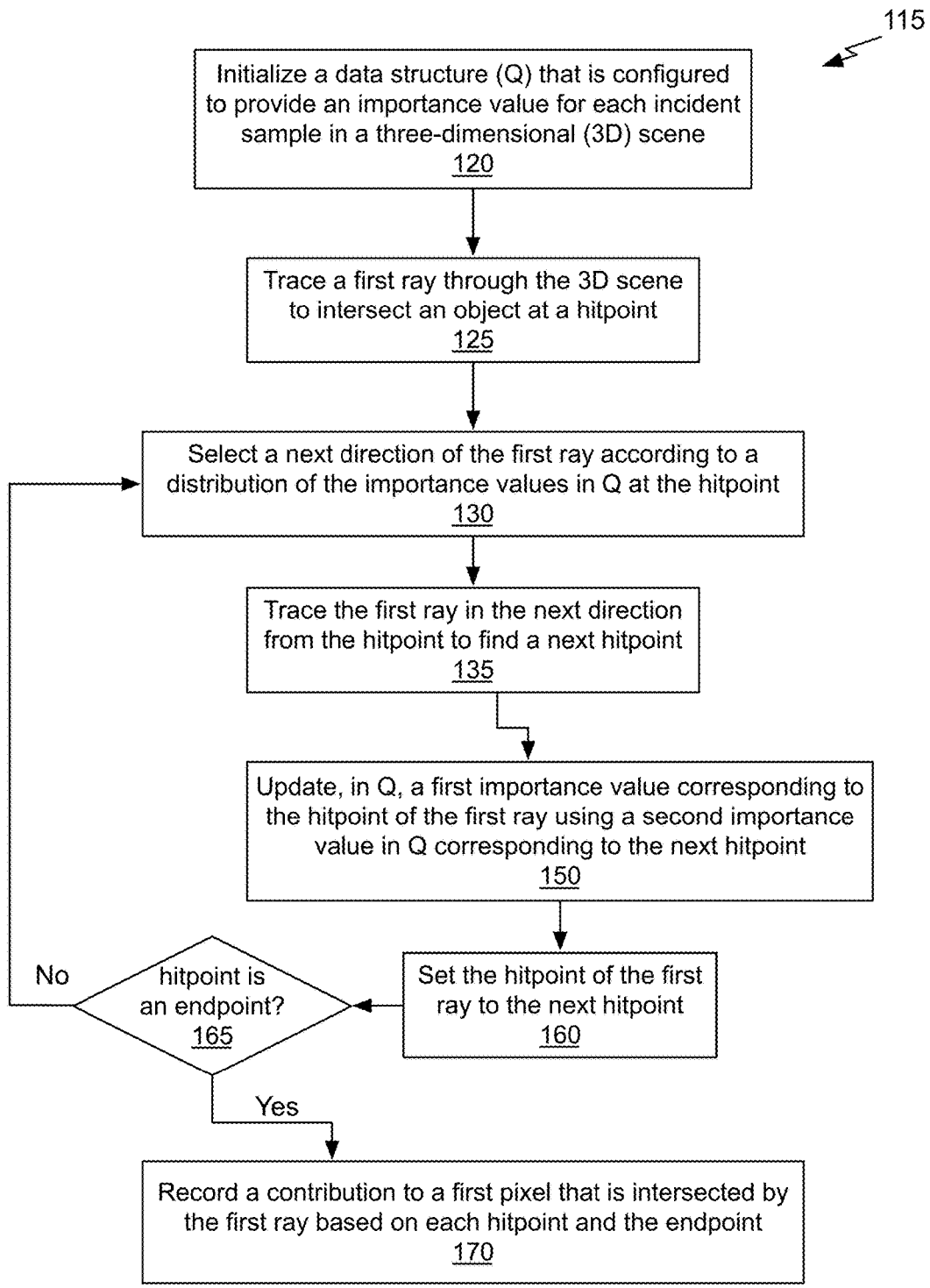
FIG. 1C illustrates a flowchart of a method for learning light transport, in accordance with one embodiment.

FIG. 1C illustrates a flowchart 115 of a method for learning light transport, in accordance with one embodiment. Although method 115 is described in the context of a processing unit, the method 115 may also be performed by a program, custom circuitry, or by a combination of custom circuitry and a program. For example, the method 115 may be executed by a GPU (graphics processing unit), CPU (central processing unit), or any processor capable of executing the program instructions. Furthermore, persons of ordinary skill in the art will understand that any system that performs method 115 is within the scope and spirit of embodiments of the present invention.

At step 120, a data structure is initialized that is configured to provide an importance value for each incident sample in a three-dimensional (3D) scene. The data structure stores incident radiance values and can be queried given a position in a three-dimensional (3D) scene and a direction. For example, the data structure $Q(x,\omega)$ may be used to store importance values, where a combination of the position x and the direction $\omega$ of a ray having an origin at x specifies an incident sample. In one embodiment, the importance values are each initialized to a value of one and then updated as rays are traced. In another embodiment, the importance values are each initialized to a predetermined value other than one.

At step 125, a first ray of a plurality of rays is traced in a direction from an origin through the 3D scene to intersect an object at a hitpoint. In one embodiment, during path tracing (i.e., light transport simulation), rays are traced from a camera through each pixel of an image plane into the 3D scene. The pixels are shaded based on radiance contributed by the light transport paths that are traced. In one embodiment, the origin is a camera. In one embodiment, the origin is a light source.

At step 130, a next direction of the first ray is selected according to a distribution of the importance values at the hitpoint. When a ray intersects a surface at a hitpoint, the data structure is used to determine a next direction for the ray to trace. The hitpoint is used to access the data structure to obtain an importance value for each possible next direction (i.e., scattering direction) for the ray. The next direction is selected based on a policy, such as a distribution of the importance values for different possible next directions at the hitpoint. At step 135, the first ray is traced through the 3D scene in the next direction from the hitpoint to find a next hitpoint.

At step 150, a first importance value in the data structure that corresponds to the hitpoint of the first ray is updated using a second importance value in the data structure corresponding to the next hitpoint. In one embodiment, the importance value corresponding to the hitpoint and the next direction is updated when the next hitpoint is identified. Importantly, the first importance value at the origin of the ray (the hitpoint) is updated based on the second importance value corresponding to the next hitpoint. Thus, the importance values effectively approximate the incident radiance for each incident sample. In other words, as the importance values stored in the data structure are updated, the directions that contribute to radiance (and pixel shading) are reinforced. Thus, the rays are guided in directions associated with higher importance that therefore contribute to the radiance of the pixels.

In one embodiment, Equation (1) is used to update the first importance value, where $Q(x,\omega)$ is the current first importance value and $Q'(x,\omega)$ is the updated first importance value.

$$Q'(x,\omega) = (1-\alpha) \cdot Q(x,\omega) + \alpha \cdot (L_e(y,\cdot\omega) + \int_{s+(y)} Q(y,\omega_i) f_s(\omega_i, y, -\omega) \cos\theta_i d\omega_i) \quad (1)$$

The integral accounts for all radiance that is incident over a hemisphere centered at the next hitpoint y. In equation (1) the hitpoint x is the origin of the ray, $\omega$ is the next direction, y is the next hitpoint, $\alpha$ is the learning rate where $\alpha \in [0,1]$, $L_e$ is the emitted radiance as observed from the origin x, and $\theta$ is the angle between the surface normal n at the hitpoint x and the next direction $\omega$. $Q(x,\omega)$ is also called an irradiance field.

At step 160, the hitpoint of the first ray x is set to the next hitpoint y to trace another segment of the first ray. At step 165, a determination is made whether the next hitpoint is an endpoint. When the light transport path originates at a camera, the endpoint may be a light source. When the light transport path originates at a light source, the endpoint may be a camera. If the next hitpoint is an endpoint, then at step 170, a contribution, based on each hitpoint and the endpoint, to a first pixel that is intersected by the first ray is recorded. In one embodiment, the contribution is a radiance value that is used to shade a pixel corresponding to the first ray.

When, at step 165, a determination is made that the next hitpoint is not an endpoint, then steps 130, 135, 150, 160, and 165 are repeated until an endpoint is reached. In one embodiment, when an endpoint has not been reached after tracing the light transport path for a predetermined number of segments, tracing is terminated and the radiance is set to the radiance of the ambient light in the 3D scene. In one embodiment, when the ray fails to hit either an endpoint or an object in the scene, a radiance value is obtained from an environment map. The fields of the ray data structure then may be used as inputs to obtain the radiance from the environment map.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Reinforcement Learning and Light Transport

The equations for reinforcement learning and light transport simulation are related integral equations. Based on this correspondence, a technique may be implemented to learn importance during path space sampling. A consistent light transport simulation technique uses reinforcement learning to progressively learn probability density functions for importance sampling to generate images. By employing reinforcement learning, the light transport simulation technique is able to guide paths around obstructions so that more paths contribute to the radiance of the image. The number of paths with non-zero radiance contribution can be dramatically increased and noise artifacts in the rendered images may be reduced. Overall, the paths may be shortened as a result of guiding the paths using the learned importance values.

The radiance that is projected onto the image plane is computed to synthesize images. For the purposes of the following description, an example of a simple conventional forward path tracer is used. From a virtual camera, rays are traced through the pixels of the screen. Upon the first intersection of the rays with the scene geometry, the light transport path is continued into a scattering direction determined according to the surface properties. Scattering and ray tracing are repeated until a light source is hit. The contribution of each complete light transport path is added to the pixel pierced by the initial ray of this light transport path when started at the camera. In the simple form, the images that are produced are quite noisy.

The noise may be reduced by importance sampling, when the importance values are progressively approximated using reinforcement learning as rays are traced by a modified path tracer. As previously described, the integral in Equation (1) accounts for all radiance that is incident over a hemisphere centered at the next hitpoint y.

Figure 2A:
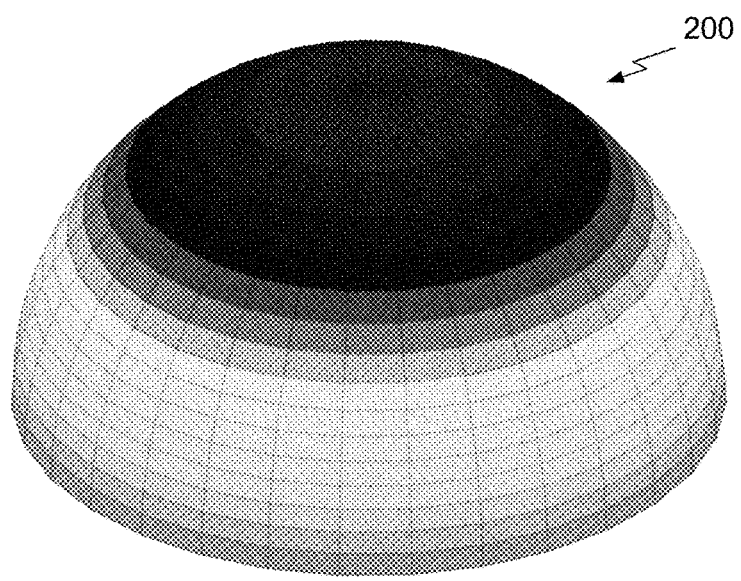
FIG. 2A illustrates a hemisphere having equally sized patches, in accordance with one embodiment.

FIG. 2A illustrates a hemisphere 200 having equally sized patches, in accordance with one embodiment. For selected points y in space, the hemisphere 200 is stratified into the patches and one importance value $Q_i(y)$ is stored per patch, i.e. stratum i. When the hemisphere 200 is centered at a position on a surface, each patch corresponds to a different set of next directions ω. The integral in Equation (1) can be estimated by using one uniform random direction $ω_i(\xi)$ in each stratum i. In other embodiments, an irradiance volume representing an irradiance field is used to approximate the importance values. In other embodiments, the hemispheres 200 may be replaced with other representations of irradiance probes.

Figure 2B:
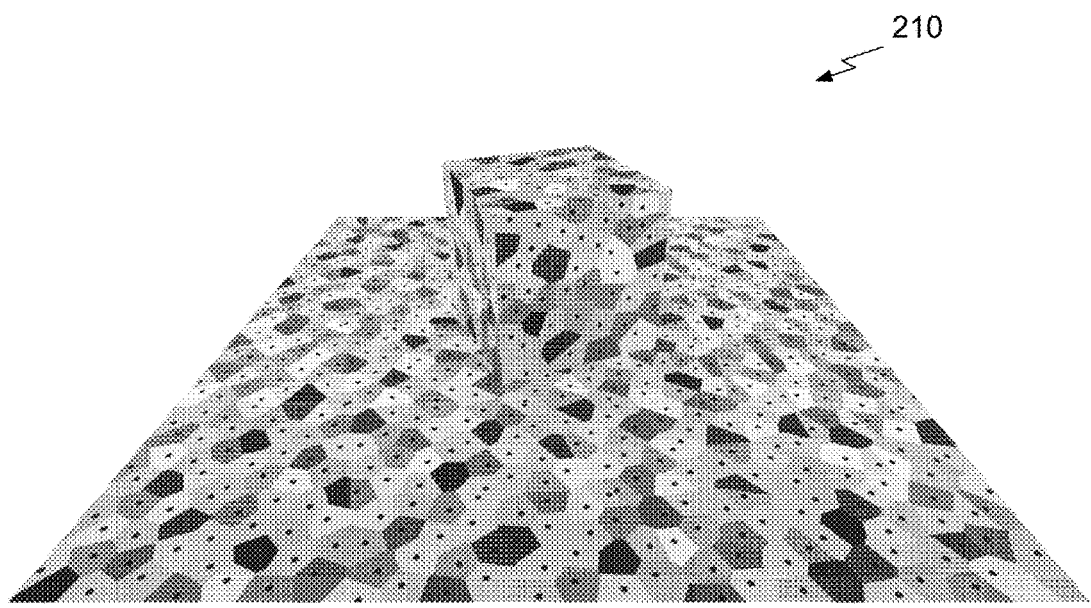
FIG. 2B illustrates a Voronoi diagram of a scene, in accordance with one embodiment.

FIG. 2B illustrates a Voronoi diagram 210 for a scene, in accordance with one embodiment. The scene includes a cube resting on a plane and the Voronoi diagram 210 results from mapping a two-dimensional low discrepancy sequence onto the scene surface forming a grid of polygons. At the center of each polygon is a position, where a hemisphere 200 may be centered. In one embodiment, the density of the grid may increased or decreased compared with FIG. 2B. When a ray intersects the surface, the hemisphere 200 with the center that is nearest to the intersection is selected for accessing the data structure Q storing the importance values. In other words, the nearest-neighbor may be used to locate a hemisphere 200. Identifying a nearest intersection may include checking other attributes, such as surface normals, for similarity.

Figure 2C:
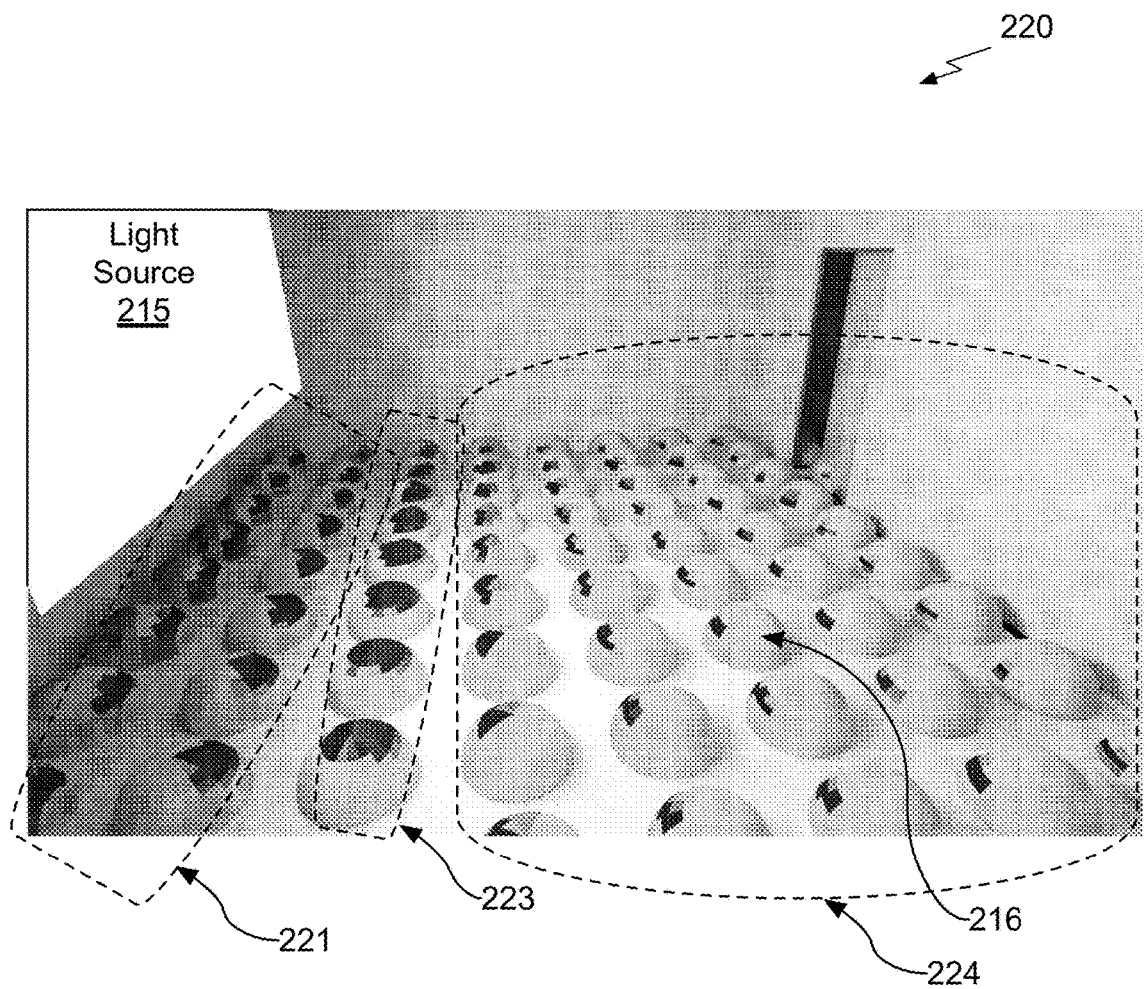
FIG. 2C illustrates an example discretization of importance values for a uniform set of points on a plane, in accordance with one embodiment.

FIG. 2C illustrates an example discretization of importance values 220 for a uniform set of positions on a plane, in accordance with one embodiment. The stippling density indicates magnitude, where small values are less dense and large values are more dense. The large importance values on each hemisphere point towards the part of the scene, where the light is coming from. For example, under the big area light source 215, most radiance is incident as reflected radiance from the wall opposite to the light source 215. Therefore, the larger importance values on the hemispheres 221 are on the upper right portion of each hemisphere. For the hemispheres 223, approximately equal radiance is received directly from the light source 215 and reflected from the wall opposite the light source 215, so larger importance values are near the tops of the hemispheres 223. For the hemispheres 224, most radiance is received directly from the light source 215, so larger importance values are on the upper left portion of the hemispheres 224.

The importance values 200 are updated based on reinforcement learning as rays are traced in the scene. For a ray intersecting a point nearest to the position centered within a hemisphere 216, a next direction that is selected for the ray should point from the hitpoint towards the larger importance values on the upper left portion of the hemisphere 216. In one embodiment, for most but not all rays, the next direction corresponding to the highest importance value is selected. In other words, the next action having the highest reward is not always selected.

In one embodiment, a probability density function resulting from normalizing the importance values at the hitpoint x is used to select a next direction for each ray. As a consequence, more and more light transport paths are generated that contribute to the image. Because the importance values are learned during path tracing, preprocessing is not needed. The importance values are initialized before the paths are traced and then updated as the paths are traced. In another embodiment, the importance values may be computed in a preprocess. In yet another embodiment, the importance values may be updated throughout a series of rendered images in an animation.

Figure 2D:
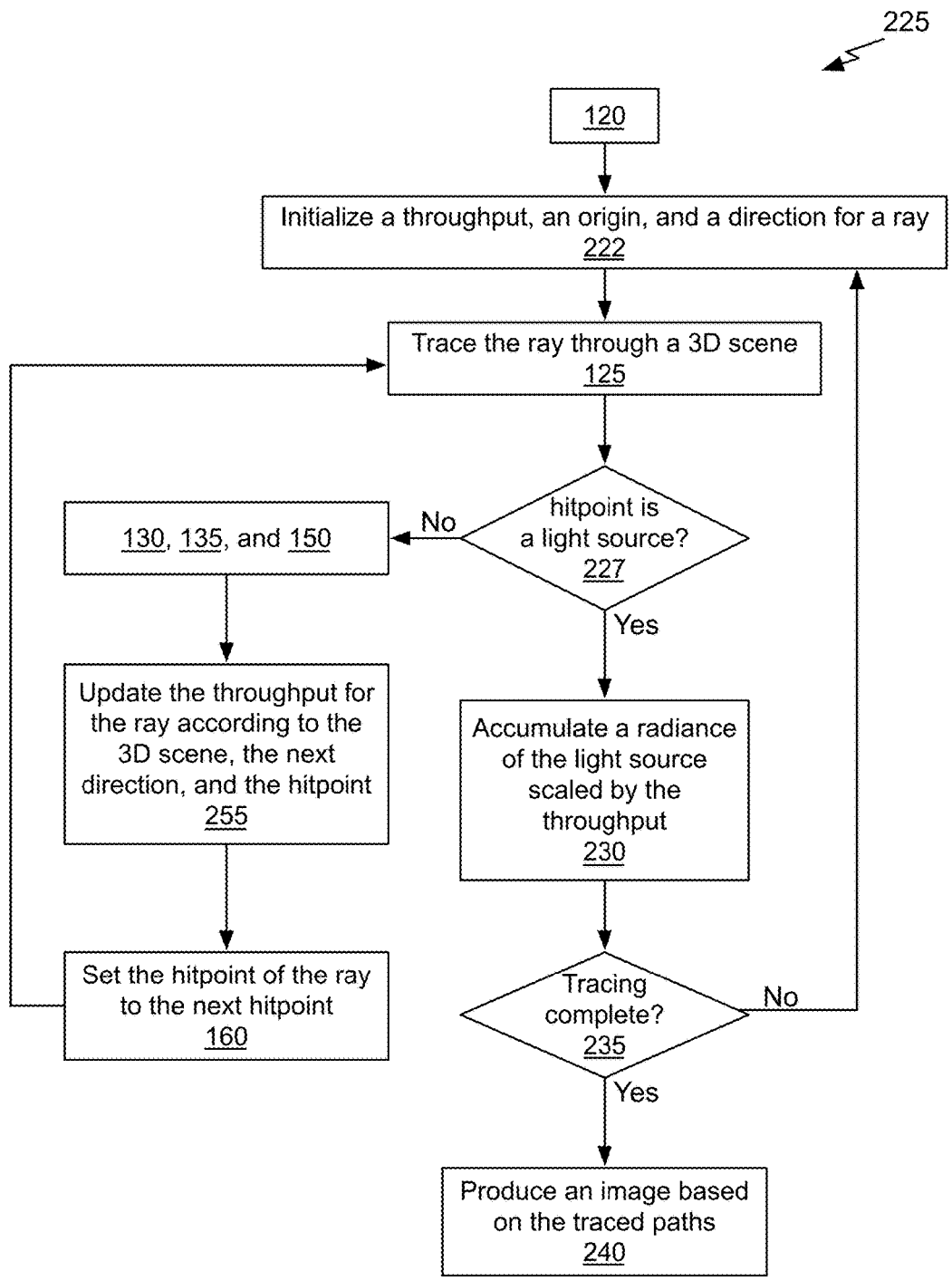
FIG. 2D illustrates a flowchart of another method for learning light transport, in accordance with one embodiment.

FIG. 2D illustrates a flowchart of another method 225 for learning light transport, in accordance with one embodiment. Although method 225 is described in the context of a processing unit, the method 225 may also be performed by a program, custom circuitry, or by a combination of custom circuitry and a program. For example, the method 225 may be executed by a GPU (graphics processing unit), CPU (central processing unit), or any processor capable of executing the program instructions. Furthermore, persons of ordinary skill in the art will understand that any system that performs method 225 is within the scope and spirit of embodiments of the present invention.

Steps 120, 125, 130, 135, 150, and 160 are performed as previously described in conjunction with FIG. 1C. At step 120, a data structure is initialized that is configured to provide an importance value for each incident sample in a 3D scene. In one embodiment, to guarantee ergodicity, meaning that every light transport path remains possible, all importance values are initialized with a positive value; for example, a uniform probability density or a value proportional to a factor of the integrand shown in Equation (1) may be utilized as initialization values. In one embodiment, during simulation importance values may not be allowed to become zero in order to maintain ergodicity.

At step 222, a throughput, an origin, and a direction are initialized for a ray of a plurality of rays. In one embodiment, the throughput is initialized to a value of one. In one embodiment, the origin is initialized to a position of a sensor. In one embodiment, a direction is initialized to point from the origin through a pixel in an image plane.

At step 125, the ray is traced in a direction from the origin through the 3D scene to intersect an object at a hitpoint. At step 227, a determination is made whether the hitpoint is a light source. If, at step 227, the hitpoint is a light source, then at step 230 a radiance of the light source scaled by the throughput is accumulated for the pixel corresponding to the ray. At step 230, a contribution of radiance of the light source scaled by the throughput is accumulated into a first pixel that is intersected by the ray. In one embodiment, the contribution is used to shade a pixel corresponding to the first ray.

At step 235, a determination is made whether tracing paths for an image is complete, and, if not, the process returns to step 222 to trace another path. Otherwise, at step 240, the image is produced based on the traced paths.

If, at step 227, the hitpoint is not a light source, then steps 130, 135, and 150 are completed. At step 130, a next direction of the ray is selected according to a distribution of the importance values at the hitpoint. At step 135, the ray is traced through the 3D scene starting from the hitpoint towards the next direction to find a next hitpoint. At step 150, a first importance value in the data structure that corresponds to the hitpoint of the ray is updated using a second importance value in the data structure corresponding to the next hitpoint.

The radiance at a point x on a surface into direction ω is modeled by a Fredholm integral equation of the second kind, as shown in Equation (1). $L_e$ is the source radiance and the integral accounts for all radiance that is incident over the hemisphere $S^+(x)$ aligned by the surface normal in x and transported into direction w. A hitpoint function h(x,ω) traces a ray from the hitpoint x into direction w and returns the first surface point that is intersected (i.e., the next hitpoint y). The radiance from the next hitpoint is attenuated by the bidirectional scattering distribution function $f_s$, where the cosine term of the angle θ between surface normal and $ω_i$ accounts for only the fraction that is perpendicular to the surface. The importance values are the radiance $L_i(x,ω)$ incident in x from direction ω and are described by the Fredholm integral equation of the second kind.

In one embodiment, at step 150, the first importance value Q(x,ω), at the hitpoint x and direction ω is updated according to Equation (1). Specifically, the first importance value is updated to the sum of Q(x,ω) scaled by one minus the learning rate α, the emitted radiance as observed from the location x, $L_e(y,-ω)=L_e(h(x,ω),-ω)$ scaled by α, and all radiance that is incident over a hemisphere centered at the next hitpoint y, $(\int_{s+(y)} Q(y,ω_i)f_s(ω_i,y,-ω)\cos θ_i dω_i)$ scaled by α.

To ensure that renderer introduced artifacts, such as noise, are reduced or eliminated over time, the importance values should converge. Convergence may be accomplished by using a vanishing learning rate α. In one embodiment, the number of visits to each incident sample (x,ω) is counted using the following equation:

$$\alpha(x, \omega) = \frac{1}{1 + \text{visits}(x, \omega)}. \quad (2)$$

In one embodiment, the learning rate α may depend on the total number of visits to a position x alone, or even may be chosen to vanish independent of x and w. The parameters that may be controlled are the discretization (i.e., the number of patches or stratum i) and the learning rate α. In one embodiment, sampling according to the learned importance values Q is realized by normalizing the importance values Q in at least one selected point x and computing the cumulative distribution function thereof to perform the sampling by inverting the cumulative distribution function. For many selected points normalizing and building the cumulative distribution function may be executed in parallel every frame to be accumulated.

At step 255, the throughput for the ray is updated according to the 3D scene, the next direction, and the hitpoint. At step 160, the hitpoint x of the ray is set to the next hitpoint y to trace another segment of the light transport path. Steps 125, 227, 130, 135, 150, 255, and 160 are repeated until an endpoint is reached. In one embodiment, when an endpoint has not been reached after tracing the path for a predetermined number of segments, tracing is terminated and the radiance is set to the radiance of the ambient light in the 3D scene before proceeding to step 230.

The previously described simple path tracer may be modified to implement an importance driven forward path tracer that employs reinforcement learning. FIG. 2E illustrates pseudo code for implementing a path tracer with reinforcement learned importance sampling, in accordance with one embodiment. Two routines are added, a first function 270 for updating a data structure Q that stores the importance values and a second function for selecting a scattering direction (i.e., next direction) that is proportional to the importance values. Normalizing an importance value $Q_i$ at a next hitpoint y then results in a probability density that is used for importance sampling during scattering by inverting the cumulative distribution function.

The pathTrace function receives a camera position and geometry for a 3D scene. A throughput and ray are initialized. As shown in FIG. 2E, the throughput is initialized to one which corresponds to 100%. The ray origin is initialized to the camera position and the direction of the ray is initialized by a selected pixel of the image. The value i is incremented for each segment of the path that is traced for the ray. An intersect function traces a ray into the 3D scene and returns a hitpoint y and a surface normal vector n of the surface. For the first segment (i=0), the data structure for Q is not updated.

If the hitpoint is invalid, meaning that no surfaces or objects are intersected by the ray, then the hitpoint is considered an environment hitpoint and a radiance value is read from an environment map using the getRadianceFromEnvironment function. If the hitpoint is a light source, then the getRadianceFromAreaLight function returns the radiance value for the light source. The returned radiance value is scaled by the throughput and the path is terminated.

If the hitpoint is not an endpoint (environment or light source), a sampleScatteringDirectionProportionalToQ function 280 is executed to generate values for a bidirectional scattering distribution function $f_s$, a next direction ω, and a probability $p_ω$ associated with the next direction that is based on both the material properties of the surface at the hitpoint and the data structure for Q queried in the ray origin point x. In one embodiment, the hemisphere 200 having a center closest to the hitpoint is located by the query. For the located hemisphere 200, the cumulative distribution function is determined and used to select the scattering direction ω proportional to Q. A probability $p_ω$ associated with the selected direction ω is provided.

The throughput is updated according to the surface color contribution of the light returned from the hitpoint back to the camera. Specifically, the throughput is updated by scaling the throughput by the bidirectional scattering distribution function $f_s$ and the cosine term of the angle θ between the surface normal n and ω that accounts for the fraction of radiance that is perpendicular to the surface, and dividing by the probability $p_ω$. In addition to updating the throughput, the origin of the ray is updated to start a next segment of the path at the hitpoint and the direction of the ray is updated to the next direction.

When i is incremented to be greater than one, the data structure storing the importance values (Q) is updated according to Equation (1). Importantly, before the data structure is updated, a next hitpoint is determined. The update procedure requires the ray origin x and its direction ω, the next hitpoint y and the normal vector at the next hitpoint y. In one embodiment, the closest point to the next hitpoint on a surface where a hemisphere is centered is located by the query.

In one embodiment, the importance value stored in the data structure for Q is scaled by $(1-\alpha)$ and summed with the product of $\alpha$ and a numerical evaluation of the integral in Equation (1). The integral may be approximated by at least one of the maximum value of Q at the query point or the sum of importance values of Q in the query point multiplied by weights depending on the bidirectional scattering distribution function. Locating a closest point may include locating a closest point with a similar normal in order not to use importance values from locations that are too different in terms of geometry.

Assuming that a decreases over time as more paths are traced, then the update value is weighed more heavily for the earlier paths. As the importance values evolve during the learning process, the weight of the update value is reduced. A path tracer that is augmented to incorporate reinforcement learning for importance sampling along each path that is traced updates the importance values stored in the data structure and selects scattering directions that are proportional to the importance values learned so far at each hitpoint.

In another embodiment, the exponential average as used in Equation (1) to update the importance values may be replaced by a simple average, where updates are simply summed up and on query are divided by the number of updates so far. In yet another embodiment, the data structure for Q may be at least one of an irradiance volume or a spatially adaptive data structure to store Q and use other representations for Q for a query point, which may include at least Gaussian mixture models.

As described in conjunction with FIG. 2E, when no surfaces or objects are intersected by a ray, an environment map may be used to determine a radiance value. Rendering sun and sky to produce an environment map is usually done by distributing samples proportional to the brightness of pixels in the environment map. More samples should end up in brighter regions, which may be achieved by constructing and sampling from a cumulative distribution function. Furthermore, the sun may be separated from the sky and simulated separately. The efficiency of such importance sampling is highly dependent on occlusion, i.e., the part of the environment that can be seen from the point to be shaded.

To consider the actual contribution including occlusion, an action space is defined by partitioning the environment map into tiles and learning the importance per tile. Noise artifacts may be significantly reduced when reinforcement learning is used to generate importance values for each tile of the environment map.

When a scene includes one or more reflective surfaces such as chrome, mirrors, and the like, light tracing may be used to generate the image. Light tracing generates rays starting from the light sources and terminating at the camera. For guiding light transport paths starting from the light sources, a transported measurement contribution function W is learned instead of the importance values corresponding to incident radiance. W values may be stored in a separate data structure or in the same data structure as the importance values. Learning W in addition to the importance values enables the implementation of bidirectional path tracing with reinforcement learning for importance sampling to guide both light and camera path segments and incorporate visibility information. Note that guiding light transport paths using reinforcement learning may reduce the time needed to render images and/or greatly improve the image quality.

For light sources having a smaller size, the resolution of the data structure to store importance values may be increased to reliably guide rays to hit a light source. A next event estimation technique may be used to improve the path tracing, even when small light sources are present. A probability per light source may be determined by the number of successful shadow rays divided by the total number of shadow rays shot.

When reinforcement learning is used, a state space may be defined as a regular grid over the scene, where in each grid cell c for each light source l a value $V_{c,l}$ is stored that is initialized with zero. Whenever a sample on a light source l is visible to a point x to be illuminated in the cell c upon next event estimation, the value of $V_{c,l}$ is updated using the following equation:

$$V'_{c,l} = (1-\alpha)V_{c,l} + \alpha \cdot \|C_l(x)\|_\infty \quad (3)$$

$V_{c,l}$ is updated to the value computed for $V'_{c,l}$ that uses the norm of the contribution $C_l(x)$. Building a cumulative distribution function from all values $V_{c,l}$ within a cell c, light sources may be selected based on importance sampling.

Reinforcement learning may also be used when virtual point light sources are present in a 3D scene. The vertices generated by tracing light paths can be considered a photon map. Furthermore, the vertices may be used as a set of virtual point light sources for when an instant radiosity algorithm is employed. Continuously updating and learning the measurement contribution function W across frames and using the same seed for the pseudo- or quasi-random sequences allows for generating virtual point light sources that expose a certain coherency over time, which reduces temporal artifacts when rendering animations with global illumination.

When reinforcement learning is used, the number of paths actually connecting to a light source (or to a camera) is dramatically improved compared with conventional importance sampling. As a result, more non-zero contributions are accumulated when the same number of paths are traced and the image quality is improved. In particular, noise artifacts are reduced and the noise that remains is more uniform and lacking the typical splotchy structure inherent in the local space exploration used by conventional techniques, such as Metropolis sampling. Note, however, that the reinforcement learning importance sampling scheme described herein could also be combined with Metropolis sampling.

Importantly, updating the importance values based on the weighted average of all possible next actions according to Equation (1) produces higher quality images compared with updating the importance values based on a "best possible action" strategy where a next direction associated with a maximum incident radiance is selected.

Shooting rays towards where the radiance comes from naturally shortens the average path length. As a consequence when the algorithm described in conjunction with FIGS. 1C, 2D, and 2E is used for the same budget of light transport paths, a speed increase of approximately 20% may be achieved compared with using conventional path tracing without reinforcement learning. A significant gain in image quality results due to the dramatic increase of non-zero contribution light transport paths, even under complex lighting.

Reinforcement learning is applied during image synthesis to guide paths and evolve the importance values. Additionally, reinforcement learning for light transport simulation can be applied during image synthesis and/or across frames, because the importance values can be updated over time. Parameters that may control the reinforcement learning process are the learning rate and the discretization of the angles for each hemisphere. Increasing the density of patches may reduce the learning speed while decreasing the density of patches may cause the importance values to converge more slowly. Instead of taking into account only the next direction corresponding to the highest importance value, equation (1) considers all possible next directions in a continuous space and weighs the importance values for the next directions by a transition kernel to update the importance value for a ray origin and direction. The amount of storage needed for the data structure storing the importance values is limited, therefore the memory footprint is also limited. In one embodiment, a data structure of 2 Mbytes of memory may be used.

Parallel Processing Architecture

Figure 3:
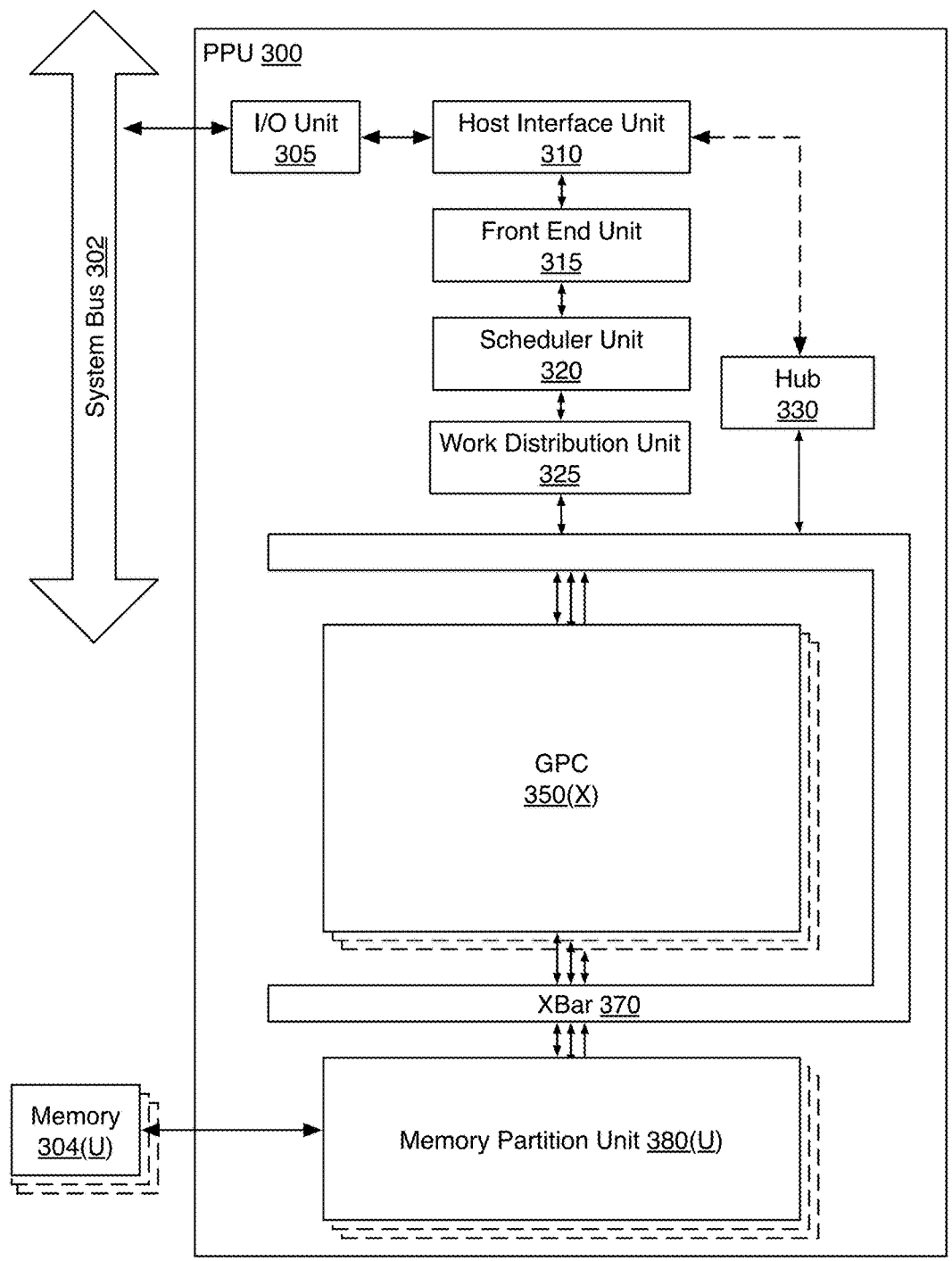
FIG. 3 illustrates a parallel processing unit, in accordance with one embodiment.

FIG. 3 illustrates a parallel processing unit (PPU) 300, in accordance with one embodiment. The PPU 300 may be configured to implement a path tracer with reinforcement learned importance sampling. In one embodiment, the PPU 300 includes one or more functional units configured to perform importance sampling operations, such as the functions shown in FIG. 2E.

In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
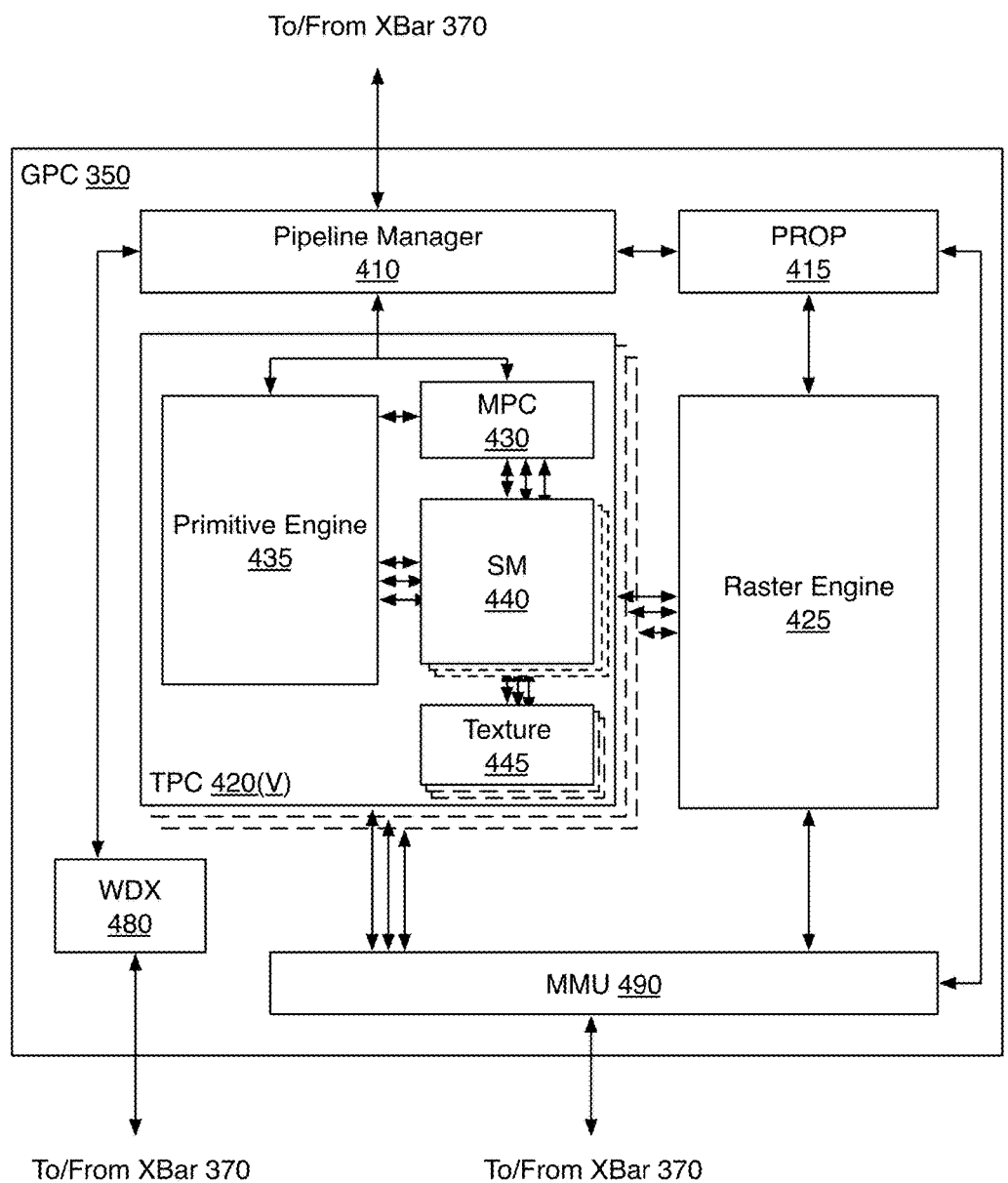
FIG. 4A illustrates a general processing cluster within the parallel processing unit of FIG. 3, in accordance with one embodiment.

FIG. 4A illustrates a GPC 350 within the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 is described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

Figure 4B:
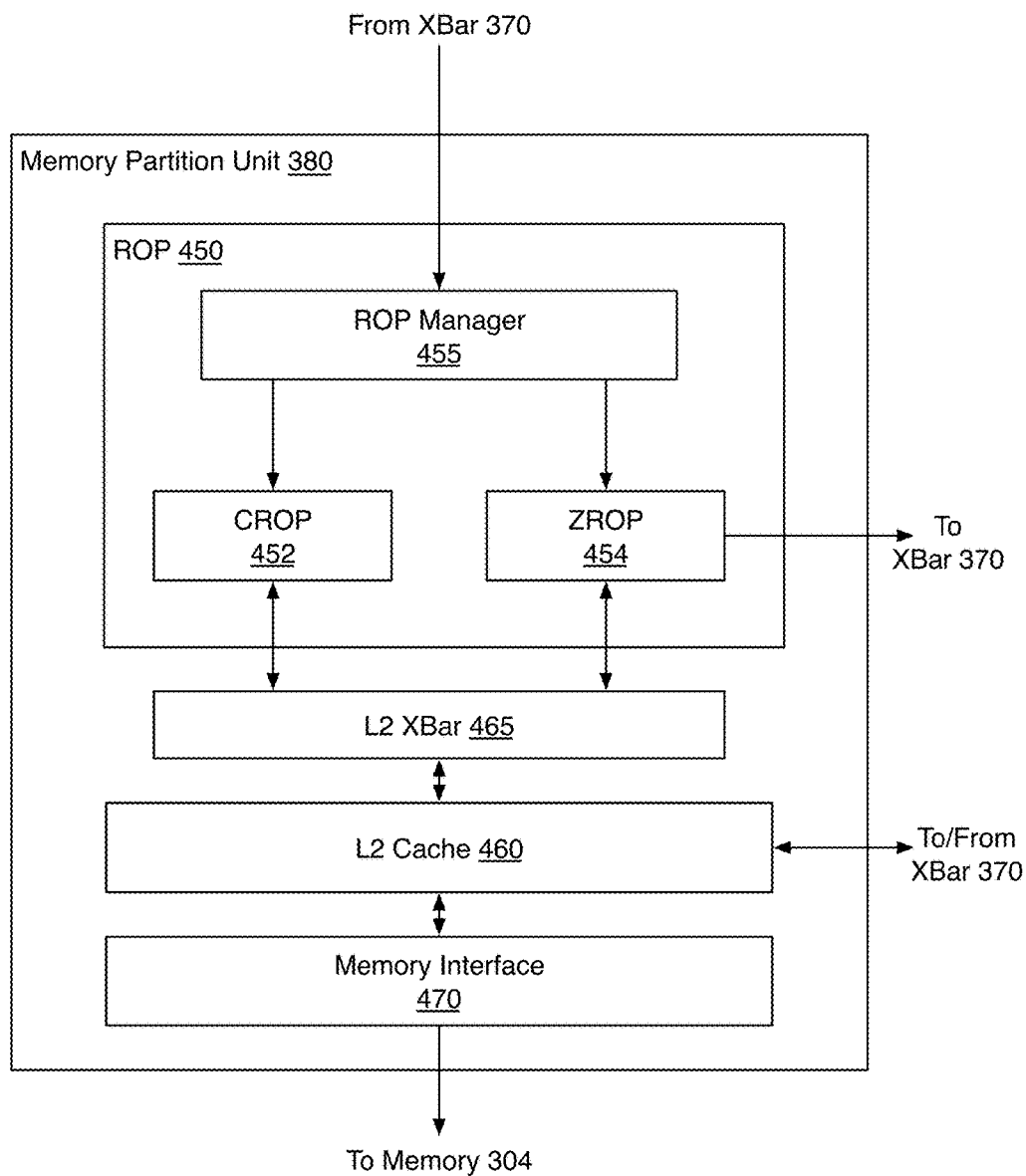
FIG. 4B illustrates a memory partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 incorporates U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
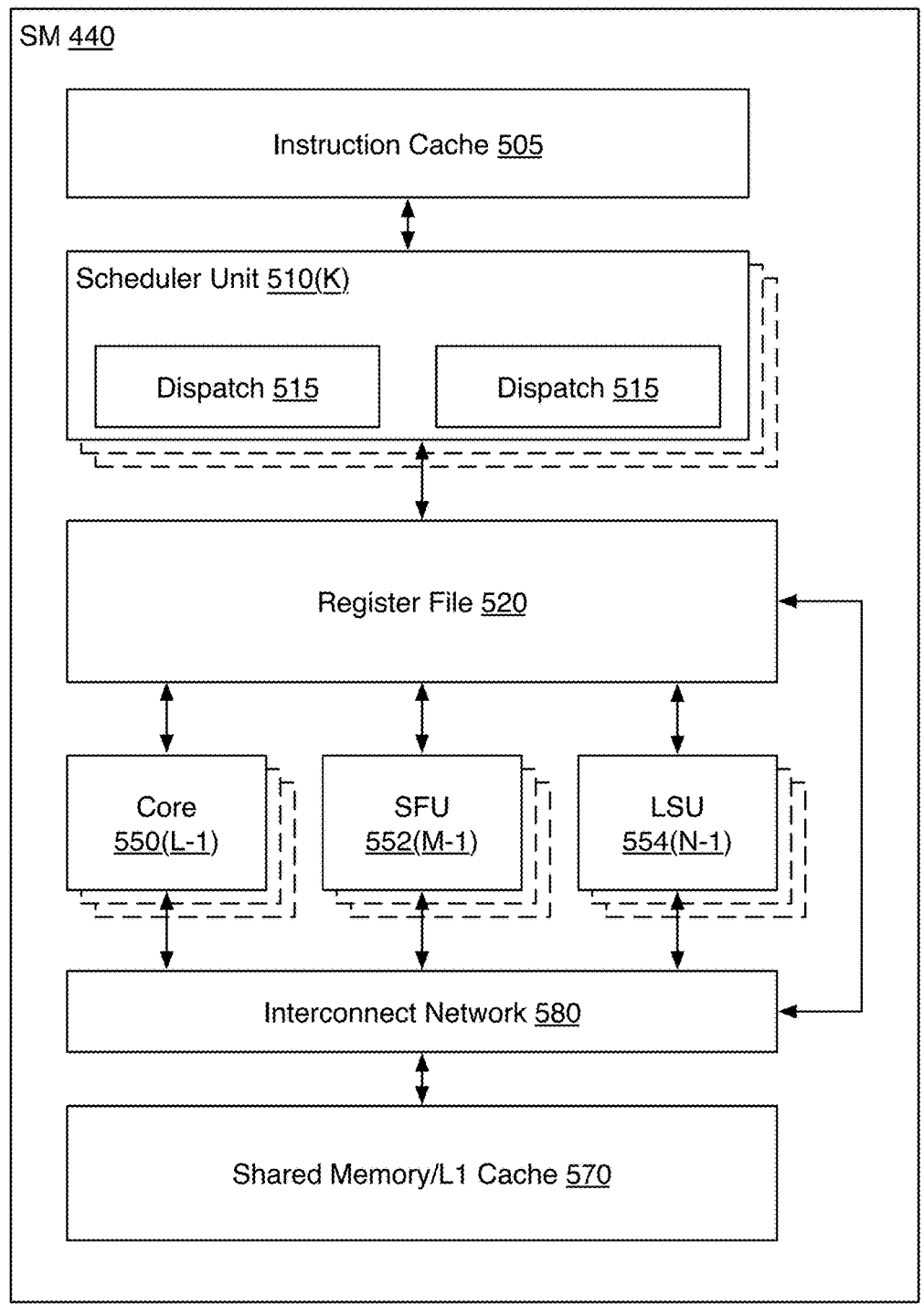
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, neural networks, deep learning, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write Global memory through partition shared memory/L1 cache 570 and partition unit 380. When configured for general purpose parallel computation, the SM 440 can also write commands that scheduler unit 320 can use to launch new work on the TPCs 420.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of a neural network. For example, the device driver may launch a kernel on the PPU 300 to implement the neural network on one SM 440 (or multiple SMs 440). The device driver (or the initial kernel executed by the PPU 300) may also launch other kernels on the PPU 300 to perform other layers of the neural network. In addition, some of the layers of the neural network may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
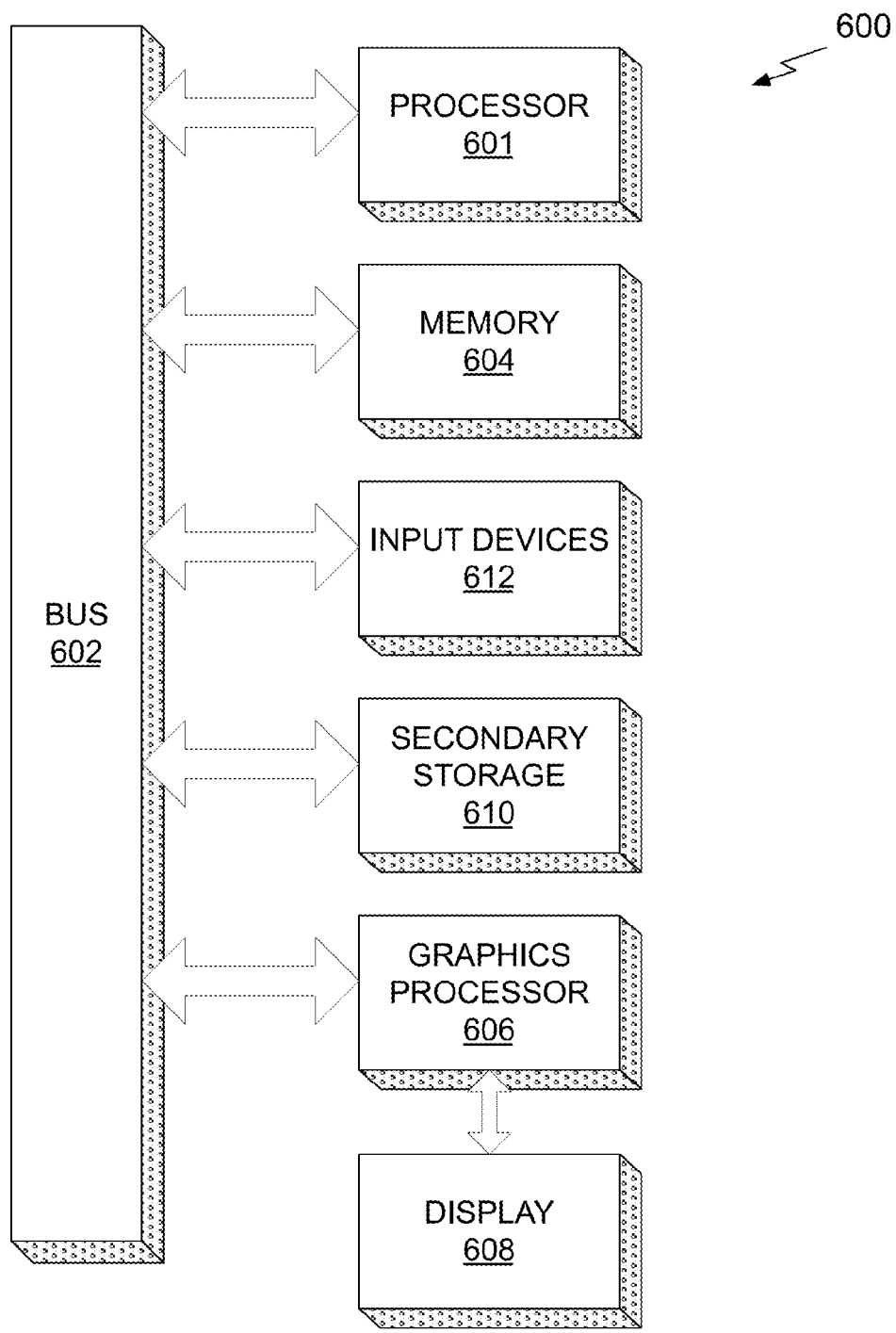
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be configured to support reinforcement learned importance sampling to generate light transport paths.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). In one embodiment, the communication bus 602 is the system bus 302 shown in FIG. 3. The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    initializing a data structure that is configured to provide an importance value for each incident sample in a three-dimensional (3D) scene;
    tracing, in a direction from an origin, a first ray of a plurality of rays through the 3D scene to intersect an object at a hitpoint;
    selecting a next direction of the first ray according to a distribution of the importance values at the hitpoint;
    tracing the first ray in the next direction from the hitpoint to find a next hitpoint;
    updating, in the data structure, a first importance value corresponding to the hitpoint of the first ray using a second importance value in the data structure corresponding to the next hitpoint;
    setting the hitpoint of the first ray to the next hitpoint;
    repeating selecting the next direction, tracing the first ray in the next direction from the hitpoint, updating the data structure, and setting the hitpoint until the next hitpoint is an endpoint; and
    recording a contribution to a first pixel that is intersected by the first ray based on each hitpoint and the endpoint.

2. The computer-implemented method of claim 1, further comprising, repeating the tracing in the direction from the origin, selecting the next direction, tracing the first ray in the next direction from the hitpoint, updating the data structure, and setting the hitpoint until the next hitpoint is an endpoint for the remaining rays in the plurality of rays before shading the first pixel.

3. The computer-implemented method of claim 1, wherein the origin is a virtual camera and the endpoint is a light source.

4. The computer-implemented method of claim 1, wherein the origin is a light source and the endpoint is a virtual camera.

5. The computer-implemented method of claim 1, wherein each incident sample is associated with an irradiance probe anchored in a position in the 3D scene.

6. The computer-implemented method of claim 1, wherein each incident sample is associated with an irradiance field queried at a position in the 3D scene.

7. The computer-implemented method of claim 1, wherein the updating of the first importance value comprises:
    scaling the first importance value by a learning rate subtracted from one;
    scaling the second importance value scaled by the learning rate; and
    replacing the first importance value with a sum of the scaled first importance value and the scaled second importance value.

8. The computer-implemented method of claim 7, wherein the second importance value is summed with an emitted radiance as observed from the hitpoint scaled by the learning rate, before the first importance value is replaced.

9. The computer-implemented method of claim 7, wherein the learning rate for each importance value is based on a number of times the importance value is updated.

10. The computer-implemented method of claim 7, wherein the learning rate is a constant.

11. The computer-implemented method of claim 7, wherein the learning rate is based on a number of times the importance values are updated.

12. The computer-implemented method of claim 1, further comprising:
    determining that the next hitpoint is invalid; and
    reading a radiance value from an environment map to generate the contribution.

13. The computer-implemented method of claim 1, wherein the updating of the first importance value comprises evaluating an integral over an irradiance field queried at the next hitpoint to compute an amount of radiance that is transported through the next hitpoint.

14. The computer-implemented method of claim 1, wherein the updating of the first importance value comprises computing at least one of an average or an exponential average of incident radiance values for an irradiance field queried at the next hitpoint.

15. The computer-implemented method of claim 1, wherein the hitpoint, the next hitpoint, and any additional next hitpoints for the first ray are used to generate a photon map.

16. A processing unit, comprising:
a memory configured to store a data structure that is configured to provide an importance value for each incident sample in a three-dimensional (3D) scene;
a parallel processing unit that is coupled to the memory resource and configured to:
initializing the data structure;
trace, in a direction from an origin, a first ray of a plurality of rays through the 3D scene to intersect an object at a hitpoint;
select a next direction of the first ray according to a distribution of the importance values at the hitpoint;
trace the first ray in the next direction from the hitpoint to find a next hitpoint;
update, in the data structure, a first importance value corresponding to the hitpoint of the first ray using a second importance value in the data structure corresponding to the next hitpoint;
set the hitpoint of the first ray to the next hitpoint;
repeat selecting the next direction, tracing the first ray in the next direction from the hitpoint, updating the data structure, and setting the hitpoint until the next hitpoint is an endpoint; and
record a contribution to a first pixel that is intersected by the first ray based on each hitpoint and the endpoint.

17. The processing unit of claim 16, wherein the parallel processing unit is further configured to repeat the tracing in the direction from the origin, selecting the next direction, tracing the first ray in the next direction from the hitpoint, updating the data structure, and setting the hitpoint until the next hitpoint is an endpoint for the remaining rays in the plurality of rays before shading the first pixel.

18. The processing unit of claim 16, wherein the origin is a virtual camera and the endpoint is a light source.

19. The processing unit of claim 16, wherein each incident sample is associated with an irradiance field queried at a position in the 3D scene.

20. A non-transitory, computer-readable storage medium storing instructions that, when executed by a processor, cause the processor to perform steps comprising:
initializing a data structure that is configured to provide an importance value for each incident sample in a three-dimensional (3D) scene;
tracing, in a direction from an origin, a first ray of a plurality of rays through the 3D scene to intersect an object at a hitpoint;
selecting a next direction of the first ray according to a distribution of the importance values at the hitpoint;
tracing the first ray in the next direction from the hitpoint to find a next hitpoint;
updating, in the data structure, a first importance value corresponding to the hitpoint of the first ray using a second importance value in the data structure corresponding to the next hitpoint;
setting the hitpoint of the first ray to the next hitpoint;
repeating selecting the next direction, tracing the first ray in the next direction from the hitpoint, updating the data structure, and setting the hitpoint until the next hitpoint is an endpoint; and
recording a contribution to a first pixel that is intersected by the first ray based on each hitpoint and the endpoint.

* * * * *